Sept. 2, 1969  J. P. MARCEL ET AL  3,465,110
MULTIPLE TIME BASE TIMER

Filed Feb. 15, 1966  6 Sheets-Sheet 3

INVENTOR
Jean Pierre Marcel
Claude Velay
BY
John W. Michael
ATTORNEY

Sept. 2, 1969   J. P. MARCEL ET AL   3,465,110
MULTIPLE TIME BASE TIMER

Filed Feb. 15, 1966   6 Sheets-Sheet 6

INVENTOR
Jean Pierre Marcel
Claude Velay
BY
John W. Mihail
ATTORNEY

3,465,110
MULTIPLE TIME BASE TIMER
Jean Pierre Marcel and Claude Velay, Milan, Italy, assignors, by mesne assignments, to Controls Company of America, Melrose Park, Ill., a corporation of Delaware (1966)
Filed Feb. 15, 1966, Ser. No. 527,415
Claims priority, application Great Britain, Feb. 15, 1965, 6,426/65
Int. Cl. H01h 7/08, 43/10
U.S. Cl. 200—38     6 Claims

ABSTRACT OF THE DISCLOSURE

A timing device arranged to operate a programme controller at intervals, the programme controller in particular being a cam bank which is rotatable at intervals to actuate electric switches. Two motors are used, one of which effects the movement of the programme controller at the end of each interval and the other of which controls the timing of the interval.

---

This invention relates to timing devices for controlling the operations of machines, such for example as domestic washing machines.

In a washing machine, such a timing device can be used for controlling the washing operations in accordance with a predetermined programme by ensuring that these operations are carried out in the required order and for periods of time specified by the programme. The timing device is accordingly arranged to operate a programme controller at intervals, the programme controller in particular being a cam bank which is rotatable at intervals to actuate electric switches. The drive for the programme controller can be a single motor which effects both the movement of the programme controller and the timing of the interval between the steps of movement of the programme controller, but it has been found convenient to use two motors, one of which effects the movement of the programme controller at the end of each interval and the other of which controls the timing of the interval. Such motors are conveniently referred to as a slave motor and a master motor respectively.

The present invention is particularly concerned with a timing device having such a master motor and slave motor.

The object of the present invention is to provide a compact and reliable two motor timing device.

According to the invention there is provided a timer for controlling the operations of a washing machine or other machine, comprising a switch-controlling cam bank, rotatable between a plurality of switch-operating positions, a first motor for rotating the cam bank to operate the switches sequentially, a motor-control switch operated by a cam follower which engages a motor-control cam of the cam bank to maintain the motor-control switch closed between said positions to ensure completion of a step from one position to the next after energisation of the motor, and a timing device driven by a second motor for controlling the length of the time interval between steps of the cam bank, characterised in that the timing device comprises a toothed rotor coaxial with the cam bank but rotatable independently thereof under the drive of the second motor, and operable in one or more of its rotational positions to energise the first motor and thereby terminate the interval.

It will be appreciated that the functions of the machine to be performed in two separate intervals may require substantially different lengths of time, and consequently it is desirable to provide intervals of differing time duration. This can be achieved, in a timing device having two driving motors, by utilising the master motor to operate a time base control device having two or more different time periods which can be selected as required.

These and other features of the present invention will be apparent from the following description of two types of timing device in accordance with the invention, which will now be particularly described with reference to the accompanying drawings, in which.

Figure 1:
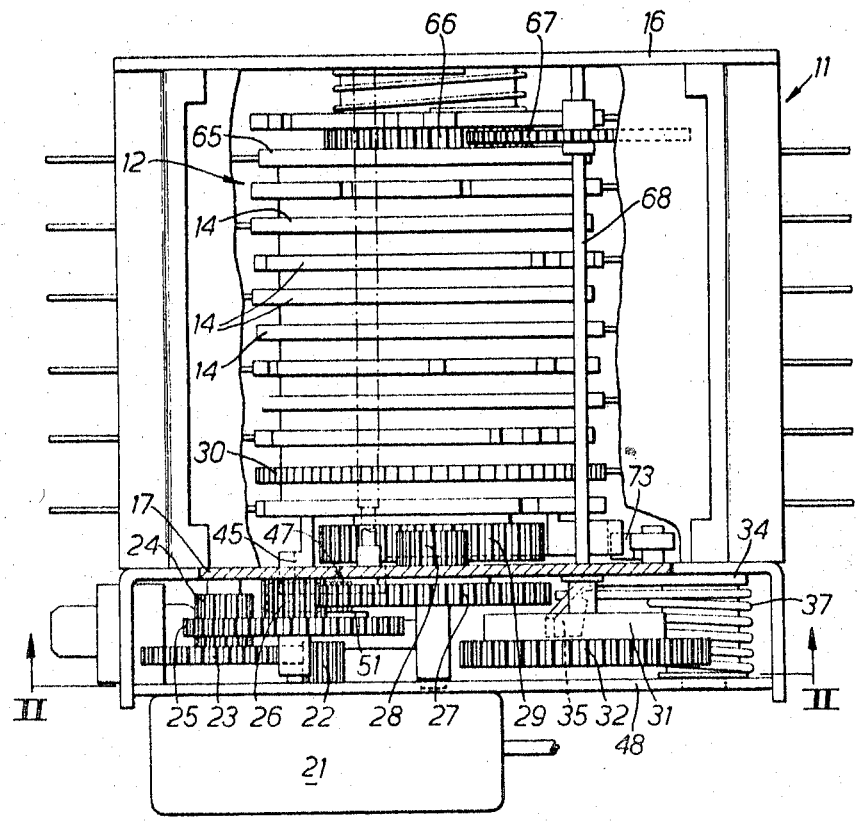
FIG. 1 is a plan view, part sectioned and with certain parts removed, of a timing device for a washing machine.

The timing device of FIGS. 1 to 4 comprises a casing 11 in which a cam bank 12 is mounted on a shaft 13 for rotation in bearings in an end wall 16 and in a partition wall 17 of the casing. The cam bank comprises a plurality of individual cams 14 which are rigidly interconnected for rotation together. Each cam operates a separate switch (not shown), some of which control the functions of the washing machine, others control the washing programme by determining which of the function-controlling switches should be connected in circuit, and others control the movement of the cam bank in a manner to be described below.

Figure 2:
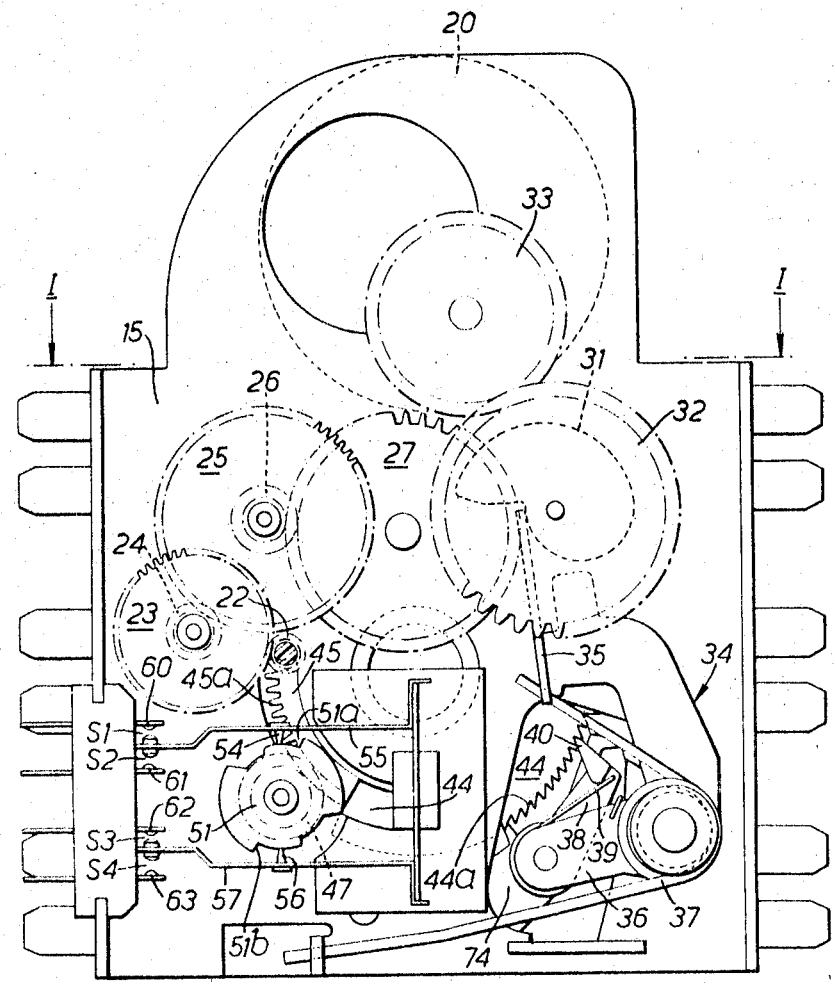
FIG. 2 is a section on the line II—II of FIG. 1.

The drive for the timing device is provided by two motors, namely a master motor 20 (FIG. 2) and a slave motor 21 (FIG. 1). The slave motor 21, when operative, drives the cam bank at a steady speed through a train of gears 22–29, the last of which is mounted on the axis of the cam bank and rigidly connected to the cam bank. The master motor 20, on the other hand, is connected to drive an interval timer in a step-by-step manner through a stepping mechanism. This stepping mechanism (which is best seen in FIG. 2) comprises a slow-rise fast-drop cam 31 which is rigid with a gear 32 driven by a pinion 33 from the master motor 20, a crank lever 34 having one arm 35 urged against the face of the cam 31 by a spring 37, the other arm 36 of which pivotally supports a pawl arm 38 which is biassed by a spring 39 to urge its pawl 40 into engagement with ratchet teeth 44a disposed along a peripheral arc of a rotor 44 (best seen in FIG. 4) mounted for angular movement about the shaft 13 of the cam bank, but independent of the rotation of the cam bank. Extending from the rotor 44, perpendicular thereto, is a sector shaped arm 45 which projects through the partition wall 17 of the casing and supports, at its end remote from the cam bank, a sector of gear teeth 45a which form a rack meshing with a pinion 47 which is journalled between the partition walls 17 and the adjacent end wall 48 of the casing.

Rigid with the pinion 47 is a cam wheel 51 (see FIGS. 1 and 4) having cam projections such as 51a and cam recesses such as 51b for engagement with a cam follower 54 on a first movable contact arm 55 and a cam follower 56 on a second movable contact arm 57, the first contact arm 55 being movable between fixed contacts 60, 61 and forming therewith two switches $S_1$ and $S_2$ (see FIGS. 2 and 5), and the second movable contact arm 57 being movable between fixed contacts 62, 63 and forming therewith two further switches $S_3$ and $S_4$.

Figure 3:
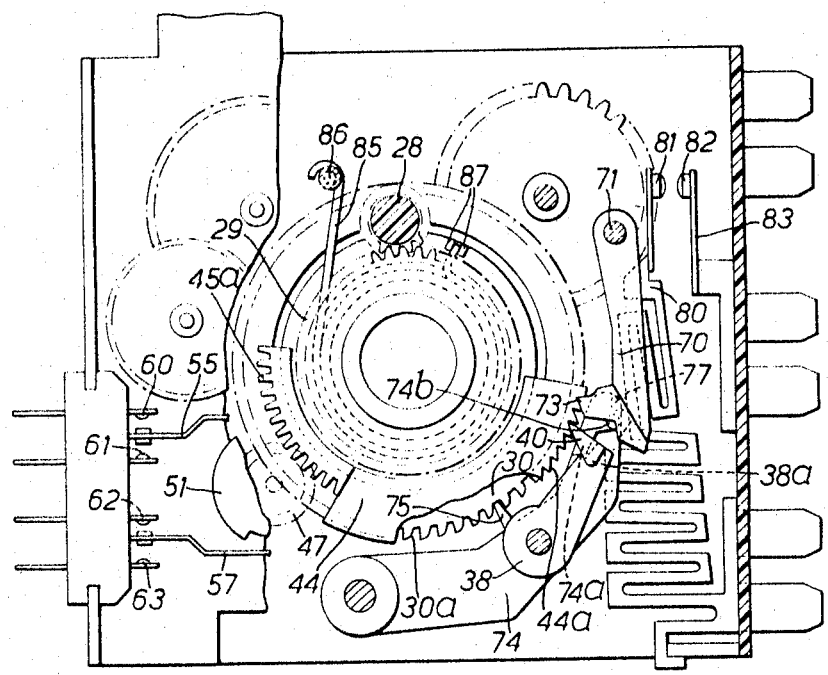
FIG. 3 is a view corresponding to that of FIG. 2 but with parts removed to show the structure lying behind that seen in FIG. 2.
Figure 4:
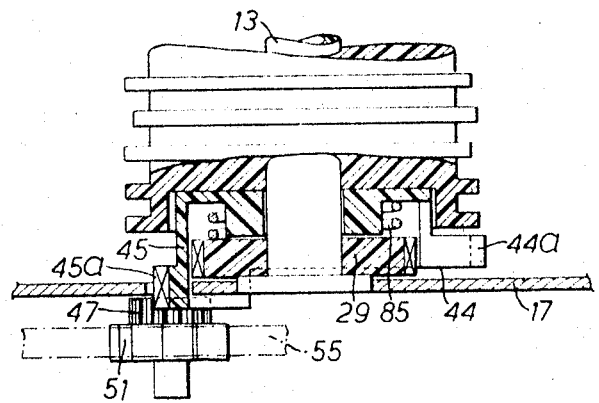
FIG. 4 is a plan view, part sectioned, of a detail of FIG. 1.

As shown in FIG. 3, a second pawl arm 70 is pivoted on an axis 71 and is spring biassed to urge its pawl 73 into engagement with the ratchet teeth 44a and prevent reverse movement of the ratchet teeth during the operation of the stepping mechanism.

Also pivoted on the wall 17 is a trip lever 74 having a projection 75 intermediate its opposite ends, which is engageable in the recesses between broad ratchet-type teeth 30a disposed around the periphery a wheel 30 forming (for convenience of design) the second cam of the cam bank. Formed on the trip lever 74 is a first abutment 74a for engagement under a corresponding abutment 38a on the pawl arm 38, and a second abutment 74b for engagement under the pawl arm 70, to raise the pawls 40 and 73 out of engagement with the ratchet teeth 44a in response to outward pivotal movement of the trip lever 74.

The outer end of the lever 74 is provided with a boss 77 which engages with a meandering-type switch contact arm 80 having a contact 81 which is engageable with a fixed contact 82 mounted on a fixed contact arm 83 in the casing. These two contacts form a switch $S_5$ (see FIG. 5).

A coil spring 85 (FIG. 1) has one end in engagement with an abutment 86 on the partition wall 17 of the casing and its opposite end disposed between two abutments 87 on the rotor, for urging the rotor backwardly, i.e. in a direction opposite to that in which it is urged by the stepping mechanism, toward a starting position.

In operation of this timing device, energisation of the master motor 20 is controlled by control switch CS which may be manually closed and reopened at the end of the programme by a cam on cam bank 12 (in the well-known manner) and operation of the master motor 20 actuates the stepping mechanism and drives the sector of ratchet teeth 44a in an anti-clockwise direction as seen in FIGS. 2 and 3. Movement of the ratchet teeth 44a rotates the rotor 44 in turn drives the cam wheel 51 through the gear teeth 45a and pinion 47. As the cam wheel 51 rotates, the cam followers 54, 56 will engage in turn with the cam recesses 51b and cam projections 51a and accordingly the switches $S_1$, $S_2$, $S_3$ and $S_4$ will be closed in turn, after four different interval times.

Figure 5:
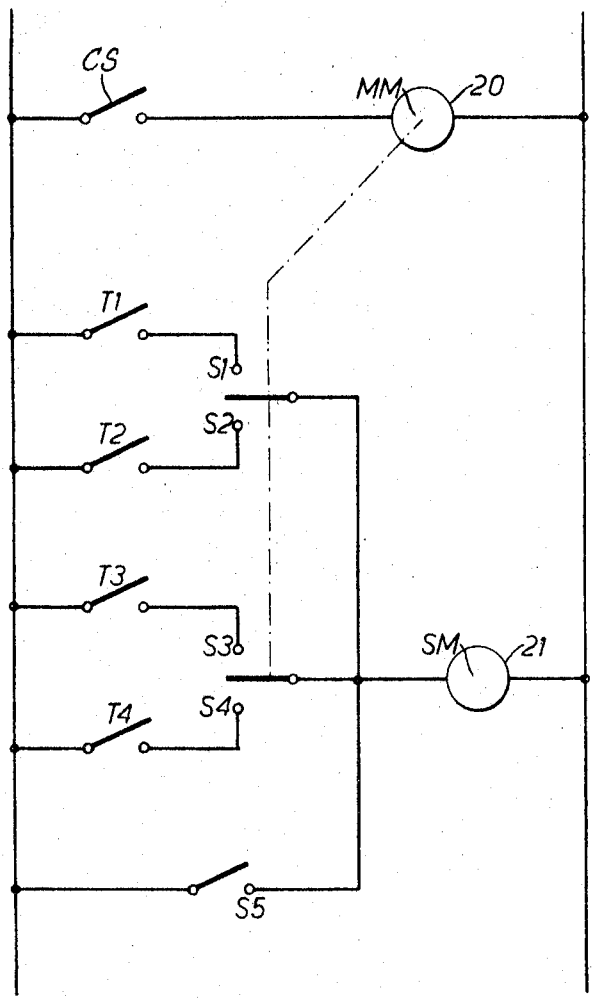
FIG. 5 is a diagram of part of the electrical circuit of the device of FIGS. 1 to 4.

As seen in FIG. 5 each of the switches $S_1$–$S_4$ is connected in series with the slave motor 21 and also in series with a separate one of four cam bank switches $T_1$, $T_2$, $T_3$ and $T_4$ respectively so that if one of the switches $T_1$ to $T_4$ is closed, closure of the corresponding one of the switches $S_1$–$S_4$ will energise the slave motor 21 and cause the cam bank to be rotated. Rotation of the cam bank will cause the toothed wheel 30 of the cam bank to lift the trip lever projection 75 out of its recess between two teeth of the cam 30 thereby pivoting the trip lever 74 and causing contact arm 80 to close the switch $S_5$. In addition, the pivotal movement of the trip lever lifts both pawls 40 and 73 out of engagement with the ratchet teeth 44a and permits the rotor to be swung back to its starting position under the restoring force of the coil spring 85 which has built up during forward rotation of the rotor. Although the backward movement of the rotor also rotates the cam wheel 51 and opens that one of the switches $S_1$ to $S_4$ which has initiated the tripping movement, the switch $S_5$ is held closed by the trip lever 74 whose projection 75 now rests on the top of a tooth 30a of the wheel 30 and energisation of the slave motor is maintained. However, when the tooth of the wheel 30 has passed underneath the projection 75 on the trip lever, the trip lever will be urged back into the next recess between adjacent teeth 30a and hence will open the switch $S_5$ to de-energise the slave motor 21, and allow the pawls 40 and 74 to re-engage the end of the row of ratchet teeth 44a.

Thus the cam bank has been driven to the start of a new interval which will now be timed in accordance with the time base selected by closure of the same one, or another one of switches $T_1$ to $T_4$.

It will thus be seen that a timing device is provided in which a programme controller is moved after a time interval the duration of which has been selected by one of the cams of the cam bank closing one of the switches $T_1$–$T_4$ thereby completing a circuit to the motor 21 when the coresponding one of the interval timing switches $S_1$–$S_4$ is closed. Although only four such switches $S_1$–$S_4$ have been shown providing four different interval durations, it will be evident that any greater or smaller number of switches can be provided to provide any time interval duration up to a maximum which is equal to the time taken for the cam wheel 51 to rotate through one revolution.

In order to provide for inversing (i.e. periodic reversal of direction of) the washing machine motor, to reverse the direction of clothes drum, one of the cam bank switches is operated by an inversing cam 65 which is freely rotatable on the cam bank and is driven through gear wheels 66, 67 in a continuous manner from gear wheel 32 via a shaft 68.

Figure 6:
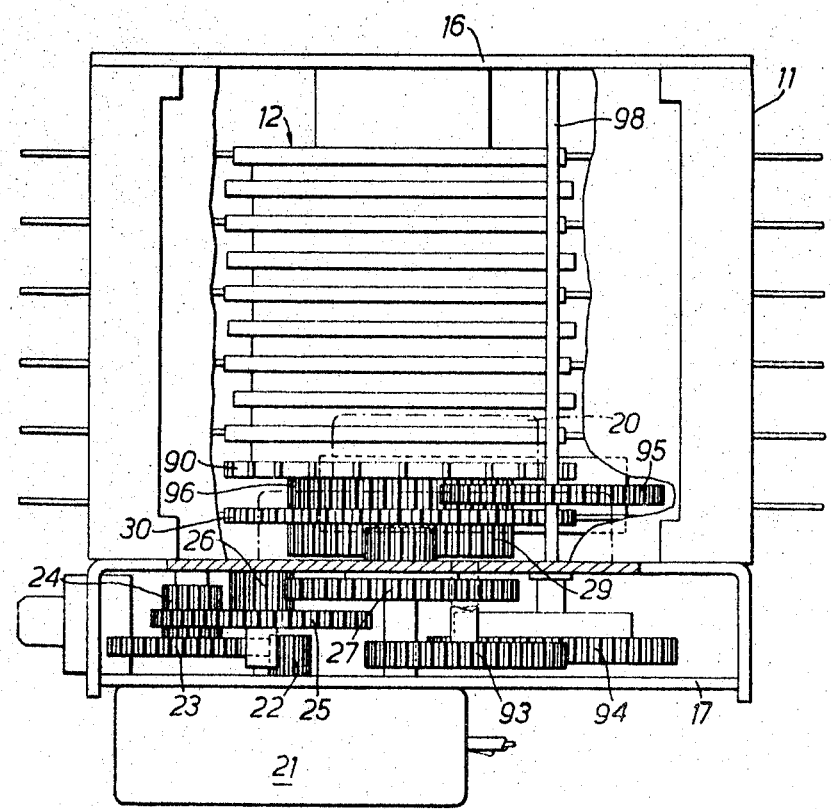
FIG. 6 is a plan view, part sectioned, of a modification of the timing device of FIGS. 1 to 5.
Figure 7:
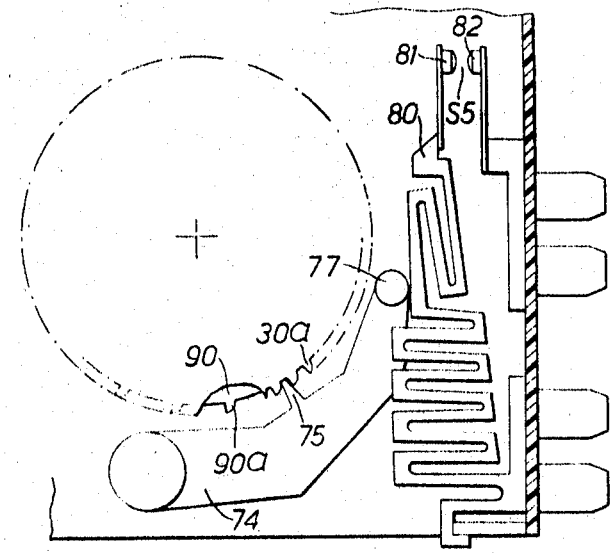
FIG. 7 is a detail of the modified timing device.
Figure 8:
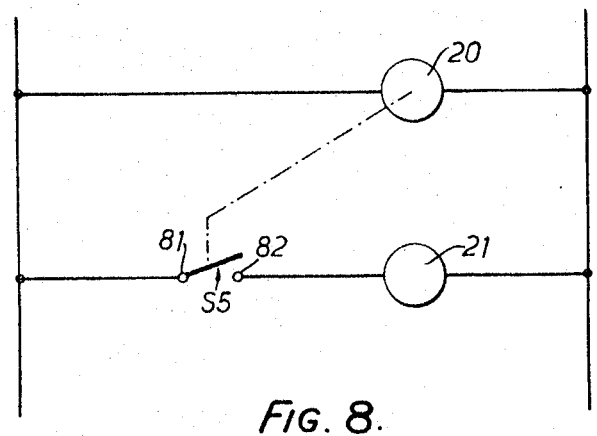
FIG. 8 is a diagram of part of the electrical circuit of the modified timing device.

A simplified form of timing device is shown in FIGS. 6, 7 and 8 in which a wheel 90 having one or more broad ratchet-type teeth 90a (see FIG. 7) and which is freely rotatable on the axis of the cam bank, is driven in a continuous manner by the master motor 20 through a gear train which comprises gear wheels 93, 94, 95, and 96, gears 94 and 95 being rigid with a shaft 98 journalled in the end wall 16 and partition wall 17 of the casing, and the toothed wheel 90 being integral with the gear 96. The drive for the cam bank is effected through a train of gears 22–29 from the slave motor 21 as in the previously described construction.

As in the previous construction, a trip lever 74 is provided having a projection 75 which is engageable in a recess between the broad ratchet teeth 30a on the periphery the toothed wheel 30 shown in this case as the first cam of the cam bank. In the present case, the projection 75 is extended laterally to overlap the periphery of wheel 90 to be engaged by the tooth, or one of the teeth, 90a thereon as the wheel 90 is rotated by the master motor 20.

In the operation of this construction, the toothed wheel 90 is rotated in a continuous manner by the master motor through the gear train 93–96 until its tooth, or one of its teeth, 90a engages with the trip lever projection 75 and lifts the trip lever to close the switch $S_5$. As shown by the circuit of FIG. 8, closure of this switch energises the slave motor which then drives the cam bank through the gear train 22–29. Rotation of the cam bank causes one of the teeth 30a to maintain the closure of the switch $S_5$ after the trip lever 74 has been released from its engagement with the tooth 90a on toothed wheel 90, and this closure is maintained until the projection 75 of trip lever 74 drops into the next recess between adjacent teeth 30a. The slave motor is then stopped and a new interval is commenced which is timed in accordance with the time taken for the tooth, or next tooth, 90a on toothed wheel 90 to engage the trip lever projection 75.

We claim:

1. A timer for controlling the operations of a washing machine or other machine comprising,
    a switch-controlling cam bank rotatable between a plurality of switch-operating positions,
    a first motor in driving connection with the cam bank,
    a motor-control switch in circuit with said first motor,
    a motor-control cam in said cam bank, said cam being profiled to maintain said motor-control switch closed when said cam bank is intermediate said switch-operating positions,
    a timing device for controlling the time interval during which the cam bank remains in a said switch-operating position, said timing device comprising,
    a toothed rotor coaxial with the cam bank,
    a second motor,
    a drive coupling connecting said second motor to drive the toothed rotor, and
    means operable by said toothed rotor in at least one of its rotational positions to energise the first motor thereby to terminate said time interval.

2. A timer according to claim 1 having
a switch-operating timing cam,
means connecting said toothed rotor to drive said timing cam,
a plurality of timing switches operable sequentially by said timing cam, and
a plurality of selection switches each connected in series with a separate one of said timing switches and with said first motor and operable by said cam bank to complete a circuit to said first motor upon closure of the corresponding timing switch.

3. A timer according to claim 2 having
a return spring biassing said toothed rotor towards a zero position,
a plurality of ratchet teeth on said toothed rotor,
a locking pawl in engagement with said ratchet teeth, and a trip device movable by said motor-control cam, when the cam bank commences rotation at the end of an interval, to release the locking pawl from said ratchet teeth thereby to permit the toothed rotor to return to its zero position under the bias of said return spring.

4. A timer according to claim 3 wherein
said drive coupling between the second motor and said toothed rotor comprises,
a slow-rise fast drop cam driven by said second motor,
a drive pawl movable reciprocally by said slow-rise fast-drop cam, and
a sector of ratchet teeth on said toothed rotor and in engagement with said drive pawl.

5. A timer according to claim 4 wherein said trip device is movable to release said drive pawl from said ratchet teeth.

6. A timer according to claim 1 wherein said toothed rotor is a toothed wheel, and further comprising,
a cam-follower engageable both with said motor-control cam and said toothed wheel, and movable to close the motor-control switch when engaged by a tooth of said toothed wheel.

References Cited
UNITED STATES PATENTS 3,089,994 5/1963 Williams _____ 307—141.4
3,171,987 3/1965 Holzer.

BERNARD A. GILHEANY, Primary Examiner

R. L. COHRS, Assistant Examiner

U.S. Cl. X.R.

307—141